United States Patent

Araki et al.

[11] Patent Number: 6,003,851
[45] Date of Patent: Dec. 21, 1999

[54] CABLE HOLD DEVICE, APPARATUS AND METHOD FOR INTRODUCING CABLES INTO A PART

[75] Inventors: Yoshihiro Araki; Takashi Ueno, both of Yokkaichi, Japan

[73] Assignee: Sumitomo Wiring Systems, Ltd., Japan

[21] Appl. No.: 08/841,188

[22] Filed: Apr. 29, 1997

[51] Int. Cl.⁶ .................................................. B25B 5/04
[52] U.S. Cl. ..................... 269/239; 269/228; 269/903; 269/268
[58] Field of Search ................. 269/239, 6, 72, 269/50, 140, 146, 307, 228, 903, 287, 268, 269

[56] References Cited

U.S. PATENT DOCUMENTS

| | | | |
|---|---|---|---|
| 4,108,589 | 8/1978 | Bunch | 269/268 |
| 4,334,358 | 6/1982 | Reynolds. | |
| 4,623,156 | 11/1986 | Moisson et al. | 269/903 |
| 4,775,121 | 10/1988 | Carty. | |
| 4,860,439 | 8/1989 | Riley | 269/903 |
| 4,877,228 | 10/1989 | Ripert | 269/903 |
| 5,257,763 | 11/1993 | Nakamura. | |

FOREIGN PATENT DOCUMENTS 0 508 674 A2  10/1992  European Pat. Off..
WO 92/12447  7/1992  WIPO.

*Primary Examiner*—David A. Scherbel
*Assistant Examiner*—Lee Wilson
*Attorney, Agent, or Firm*—Anthony J. Casella; Gerald E. Hespos

[57] ABSTRACT

A cable sold device 10 comprises a top portion 14 and a base portion 12 which are connected with each other via a hinge 15 and define a space 18 for accommodating at least one cable C. The movement of the at least one cable C in the space 18 is restricted while the top portion 14 and the base portion 12 are closed with respect to each other. Further, an apparatus 500 for introducing the cables C into a grommet 6 comprises the cable hold device 510, a grommet hold device 510 for holding the grommet 6 substantially in line with the cables C, and an actuation mechanism 520 for causing a relative movement of the grommet hold device 510 with respect to the cable hold device 10.

14 Claims, 12 Drawing Sheets

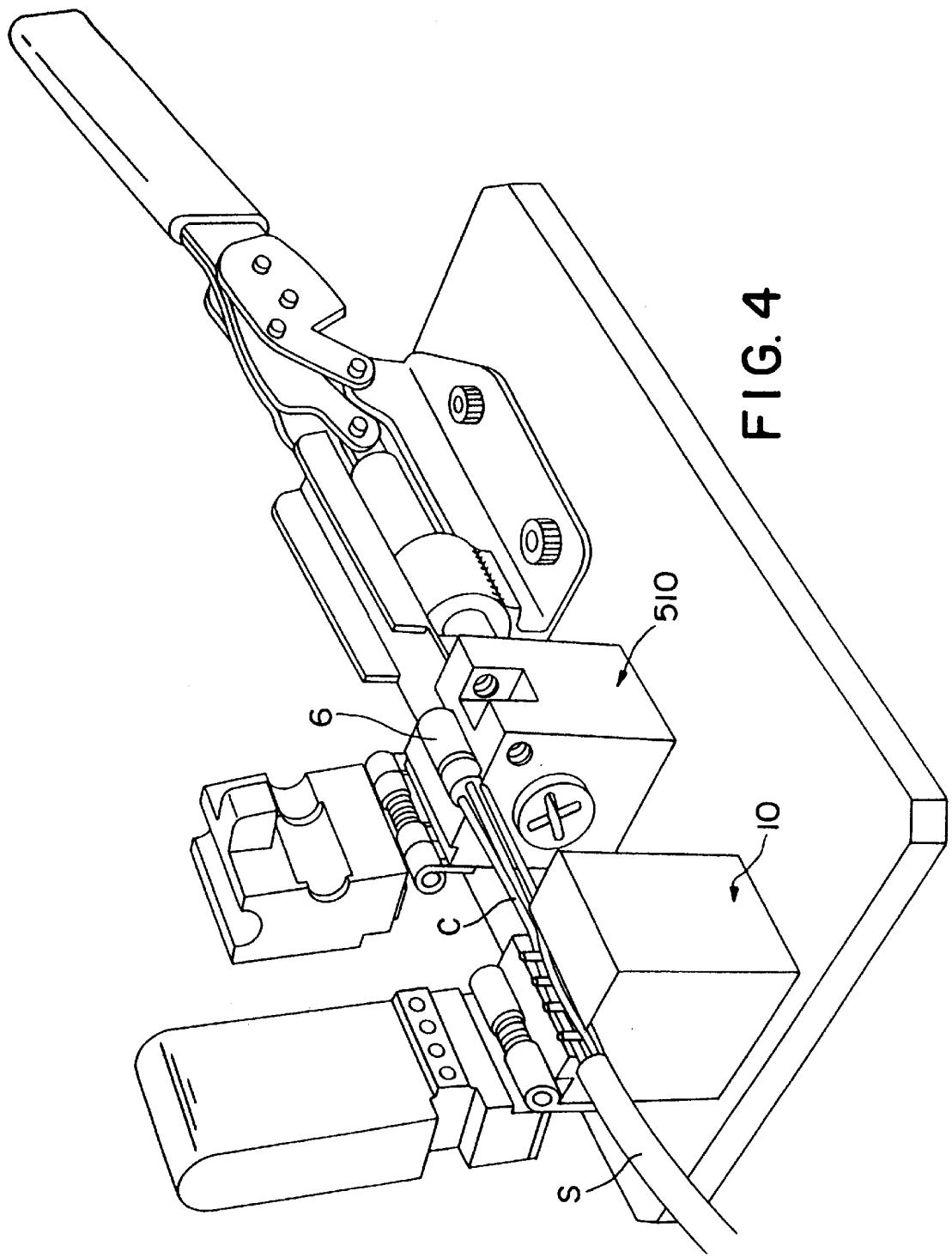

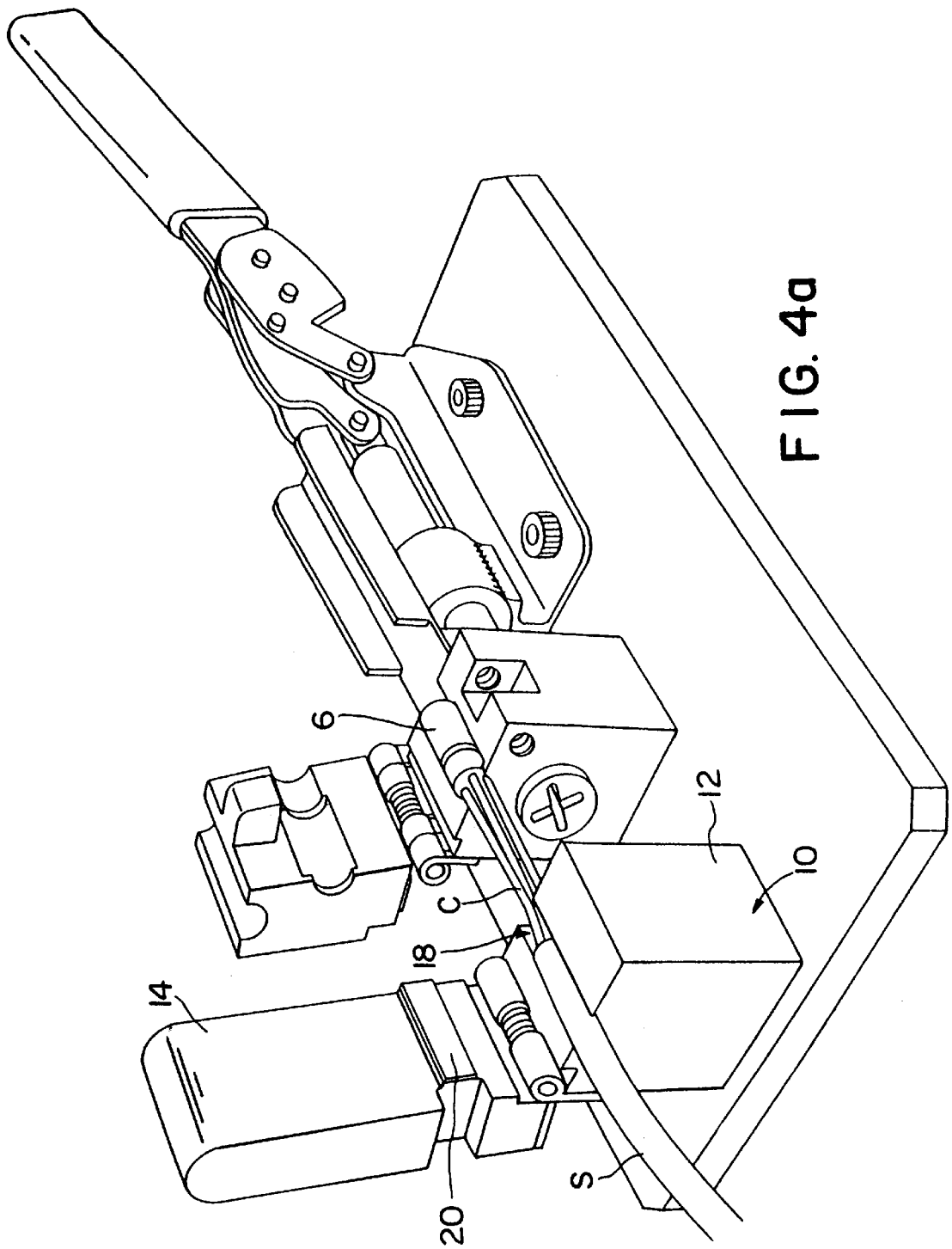

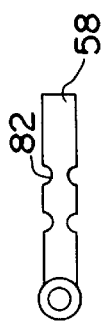
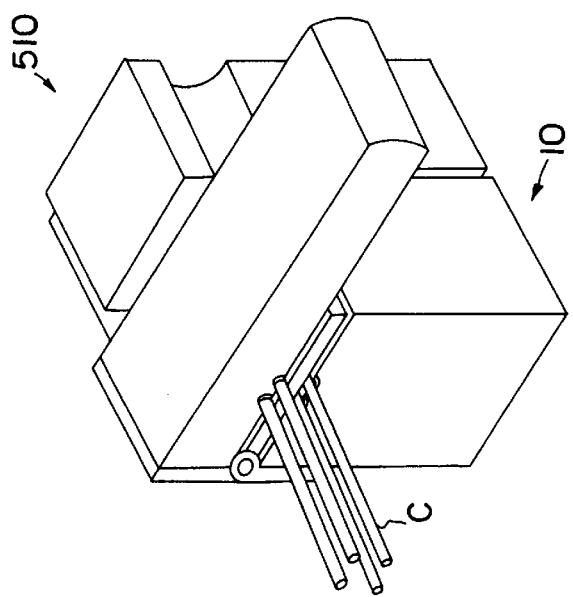
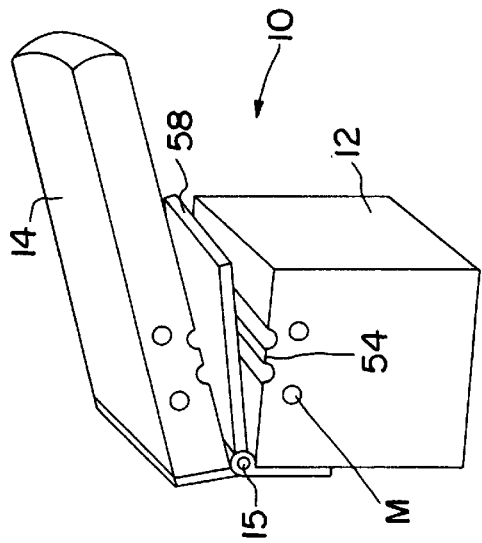
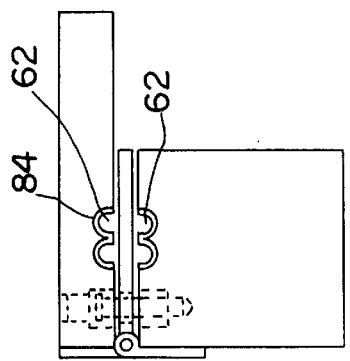

CABLE HOLD DEVICE, APPARATUS AND METHOD FOR INTRODUCING CABLES INTO A PART

BACKGROUND OF THE INVENTION

1. Field of the Invention

This invention relates to the assembly of one or more cables with a part such as a connector or a grommet into or through which one or more cables are to be inserted or passed through. In particular, the invention is directed to the assembly of a wiring harness comprising at least one connector, one grommet, one cable and a sleeve or tube surrounding the cable. The invention provides a cable hold device, an apparatus and a method for inserting and/or passing at least one cable into and/or through a part such as a grommet or connector.

2. Description of the Prior Art

Japanese Unexamined Utility Model Publication No. 6-88127 shows a known device with which a plurality of cables can be simultaneously passed through a grommet. This known device comprises a holding tool for holding the grommet, a wire positioning portion comprising a wire pressing portion for restraining the wires on the wire aligning table. The pressing portion is openable and closable. An operating lever is provided so that the grommet holding tool can be pushed towards and away from the wire positioning portion.

One of the problems inherent to this known device is a risk of damaging the cables, in particular the coating which surrounds the conductors making up the cables, in that there is a risk of scratching and/or deforming, in particular, bending the cables during their insertion or passage through the grommet. The grommet is also susceptible to damage.

An object of the invention is to provide a cable hold device which can surely prevent any damage and/or deformation to the held cable and/or grommet.

It is another object of the invention to provide a cable hold device capable of handling a tube, sleeve or sheath surrounding the one or more cables.

It is another object of the invention to provide a cable hold device which allows proper positioning of the one or more held cables.

It is yet a further object of the invention to provide a cable hold device which allows automation and which enhances the ease of use when one or more cables are to be held.

It is a further object of the invention to provide an apparatus for inserting and/or passing at least one cable into and/or through a part such as a grommet or connector having holes for accommodating or for inserting and/or passing at least one cable, which apparatus is able to prevent any damage and/or deformation of the cable and/or grommet.

It is also an object of the invention to provide an apparatus for inserting and/or passing at least one cable into and/or through a part such as grommet or connector which allows easy handling, automation and/or enhanced reliability.

Further, it is an object of the invention to provide a method of inserting and/or passing at least one cable into and/or through a part such as a grommet or connector which prevents any damage or deformation of the one or more cables.

Finally, it is an object of the invention to provide a method which allows automation, enhanced reliability and/or with which production rate can be enhanced.

SUMMARY OF THE INVENTION

The above objects are solved by a cable hold device, an apparatus for and a method of inserting and/or passing at least one cable into and/or through a part such as a grommet or connector having the features of the independent claims, respectively. Preferred embodiments are defined in the respective dependent subclaims.

According to the invention, the cable hold device comprises top and base portions hingedly connected with each other and defining a space for accommodating at least one cable, wherein the movement of said at least one cable in said space is restricted while said top and base portions are closed with respect to each other. In particular, said space is dimensioned and designed such that said one or more cables can be held without causing any damage to the coating of said cables and such that the cables are simultaneously properly aligned and guided. Accordingly, the movement of said one or more cables in said space is restricted in at least one direction, in particular is inhibited in all directions, but one when said top and base portions are closed with respect to each other, in particular when a closing force is applied. The restriction of the movement can partly or fully, i.e. in one or all directions be released either by releasing a force acting on said top and or base portion or by fully opening said top and base portions with respect to each other.

Preferably, said space is at least partially provided for handling, in particular accommodating, a tube or sleeve surrounding said at least one cable. In many applications there exists a need to handle a sleeve surrounding said at least one cable, in particular for allowing and/or inhibiting a relative movement of said one or more cables with respect to said sleeve. By forming the space as above, the cables surrounded by a sleeve can easily be handled.

Preferably, the movement of said at least one cable is restricted by imparting a force to the tube or sleeve surrounding said at least one cable. Accordingly, the movement can be restricted for instance to one direction without any direct impact to said one or more held cables. The movement may supplementally be restricted with respect to other directions by a direct action onto said one or more held cables. However, it is particularly preferred that in order to provide optimum protection for the held cables, the sleeve or tube be interposed between said top and base portions and said one or more cables. Accordingly, the sleeve is used as an intermediate means for protecting said held cable against scratches, deformations and the like.

The inventive cable hold device preferably comprises a plate, in particular a wedged or a stepped plate which forms one of the walls defining said space. If such a friction plate is provided at the top portion, there can be formed a movable and, in particular, adjustable upper wall portion which acts on said held cable. Thus, the obtained restriction of the movement of said cable can be enhanced. In particular, when a stepped plate is provided, one part thereof can act to impart a force onto the sleeve, whereas the other portion can act to directly exert a force onto said cable. Further, with the use of a stepped plate, the movement of the sleeve and/or restoration thereof when compressed or deformed can be restricted independently from the restriction of movement of said one or more cables.

Preferably, said space for accommodating said one or more cables and/or said sleeve is tapered or stepped in order to vary the degree of the movement restriction over the length of said cable hold device with respect to the direction of extension of said one or more cables accommodated in said space. Further, the entire space may be adapted to shapes and sizes of said one or more cables and/or said sleeve, thus providing selected restriction of the movement of said cable and/or sleeve. In particular, when said space for accommodating said cable and/or sleeve is stepped, there can be provided a larger space for accommodating, clamping and/or holding said sleeve and a smaller space for accommodating, clamping and/or holding said cable. Further, by providing a space having variable dimensions in particular a tapered or stepped space, the guiding abilities of said cable hold device can be enhanced.

Preferably, said space is provided for accommodating at least two cables and comprises further partitioning means for partitioning said space so as to define subspaces for a single cable or a group of cables, respectively. By providing partitioning means, the cable can properly be aligned and/or oriented, whereby more accurate positioning can be realized. The partitioning means itself can also restrict the movement of the held cables to a certain degree. Further, it is also possible to more uniformly distribute the force on said cables when said top and base portions are closed with respect to each other.

The cable hold device preferably further comprises sleeve retaining means to prevent the movement and/or passage of a tube or sleeve surrounding said one or more cables in or through said space. The cables surrounded by the sleeve can be held without or with a specific interaction with said sleeve. The sleeve retaining means can also act to prevent the restoration of a compressed or deformed sleeve or tube.

Said partitioning means preferably is formed of pins or a plate, extending substantially normal to the extension of said cables. In particular, it is preferred that one of said pins or the end of said plate acts as sleeve retaining means. Further, it is preferred that the top and base portions are formed such that the opening and closing with respect to each other is not hindered by said partitioning means, and further preferred that they be recesses for accommodating said partitioning means when said top and base portions are closed with respect to each other. Thus, on the one hand no interference occurs during the closing and opening of said top and base portion, and on the other hand the stability or strength of said partitioning means can be improved.

The partitioning means preferably is hingedly connected to said top and base portions, preferably at the same hinge point. Thus, the partitioning means which is, for instance, in the form of a plate, can be opened and closed with respect to said top and base portions, respectively. In particular the movement of said partitioning means and said top and base portions is coupled by means of a mechanical device such as a gear or a cam in combination with a cam follower. Although it is preferred that such partitioning means is hinged at the hinge point of said top and base portions, as a particularly simple constructive design, it is also possible to adapt a simpler construction wherein said partitioning means are provided more independently from the closing action of said top and base portions. Thus, the partitioning means, which preferably extends substantially parallel to the extension of the cables, is only allowed to move when said top and base portions are opened to a certain extent. It is also to be noted that the partitioning means need not necessarily be hinged. Partitioning means may be inserted between the cables in any desired position of said top and base portions, e.g. when said top and base portions are opened, closed or moved with respect to each other.

The partitioning means is preferably formed of a partitioning plate which extends substantially between said top and base portions when these are closed with respect to each other, thus extending in a plane substantially parallel to a plane in which said cables extend. The partitioning plate may extend over the full area of said top and base portions or only over a part thereof. In particular, one end of said partitioning plate acts as sleeve retaining means. It is also to be noted that several of such partitioning means may be used in combination. In particular when using several moveable partitioning plates, the respective cables can be selectively held and/or released by selectively moving one of said partitioning plates. However, for ease of use, it is preferred that the movement of said partitioning plate(s) immediately follows the moving action of said top and base portions with respect to each other.

Said partitioning means preferably acts to serve as sleeve retaining means for preventing the passage through said space of a tube or sleeve surrounding at least partly said cable. Then it is possible to prevent the movement of said sleeve during the movement of said cables, in particular when said top and base portions are free of any load and/or at least partly opened with respect to each other. Thus, the sleeve surrounded cables can be handled without necessitating a further element for retaining or restricting the movement of said sleeve.

In many applications it is cumbersome to handle the tube or sleeve, particularly when it is deformed or compressed, e.g. during a preceding movement of said one or more cables. The deformed or compressed tube or sleeve tends to counteract or hinder the insertion and/or passing through due to its elastically restoring force. Accordingly, said sleeve or tube retaining means should also be able to prevent the restoration of a compressed or deformed sleeve. In particular said sleeve retaining means has a stepped or contact surface such that the tube or sleeve does not act onto said part such as grommet or connector.

Preferably, the cable hold device further comprises at least one biasing means for biasing, in particular spring biasing, said top and base portions and/or said partitioning means. By providing said biasing means, said top and base portions and/or said partitioning means can be biased towards an open or closed position. In both cases, the biasing force has a direct influence with respect to the force to be exerted on said top and base portion required to provide the desired restriction of movement of said cables and/or sleeve. Thus, it is possible to provide a cable hold device which does not require any application of force during the holding of said cables, as this action can fully be achieved by said biasing means. In particular, when biasing means are also provided for the partitioning means, the force acting on the cables at one or both sides of the partitioning means can be adjusted by adjusting said biasing force. Preferably, said biasing means is comprised of a spring provided at the hinge point of said top and base portions and/or of said partitioning means.

The biasing means may also be incorporated into or alternatively surround the partitioning or other means extending substantially perpendicular to the extension of said one or more cables, wherein said other means can abut against and guide said top and base portions and/or said partitioning plate(s).

Preferably, the cable hold device further comprises marks for identifying cables and/or the location thereof. Thus, the ease of use can be enhanced, thereby preventing unduly insertion or alignment of said cables. In particular, said marks may be in the form of colors or other indexing means, corresponding to the respective held cables. These marks may be provided in such a way that they may be removed or replaced.

The walls defining said space and/or said partitioning means may have rounded or tapered end portions in order to facilitate the insertion of the ends of the cables. Such rounded or tapered end portions further enhance the protective ability of said cable hold device during the holding of said cables, in particular during the insertion of said cables into said cable hold device or during the movement of the held cables with respect to the cable hold device, and securely prevent said sleeves from being damaged, scratched or cut.

Preferably said top and base portions and/or said partitioning means, in particular said hinged partition plate are formed with recesses in order to improve the fitting and/or improved guiding for said cables. The fitting and/or guiding by said recesses can realize and/or improve said restricted movement of the held cables. Furthermore, a wedged or stepped plate may also be provided together with respective recesses in order to properly accommodate the respective cables, groups of cables and/or said sleeve surrounding said cables. In particular, said recesses may be formed with exchangeable inserts in order to allow the adaptation of said cable hold device to the different needs when using cables which have different sizes, etc., whereby the necessity of using a separate cable hold device for each type of cable is avoided.

Said cable hold device preferably further comprises a handle and/or locking means for closing said top and base portions with respect to each other and for holding the top and base portions locked in the closed positions. As the use of the locking means obviates the need for an operator to handle the cable hold device for holding said cables, both his hands are free for other operations thereby improving the operability of the cable hold device. Preferably, the locking means is actuated to set the cable hold device in different locking positions, such that the load acting on said cable hold device in the locked positions can be selected. In other words said cable hold device can be set in a locked position in which no force is imparted onto said cables and can also be set in one or more locked positions wherein distinct forces are applied onto said sleeve and/or cables. Preferably, the locking means is one with which a quick change or release of the respective locking positions can be effected.

Preferably, said cable hold device further comprises at least one cam means, in particular an eccentric cam or cam section for restricting the movement of said one or more cables, particularly in all directions but one. The advantage of using cam means results from the fact that the force acting on said cable is dependent on the position of the cam means and thus, adjustable. When using an eccentric cam or cam section, the relative movement of one or more cables in engagement with the eccentric cam means is inhibited in one direction, while being allowed in the opposite direction. This is because a selflocking occurs during the movement in on direction, whereas this self-locking does not occur during the movement in the opposite direction. Thus, it is preferred that the cam means be supported with respect to an axis extending substantially normal to the direction in which said cables extend and/or are to be moved.

Preferably, cam means are provided at both the top and base portions, so that the effect of such cam means is doubled. Specifically, the cam means act from above and below when one single layer of cables are held, whereas the top portion cam means and the base portion cam means act on the corresponding layers of cables when two layers of cables are held. At least one, and preferably two or more cam means are provided for each held cable, whereby the movement of each cable can be independently restricted. It is also to be noted that the cam means are preferably designed and sized such that there is no interference with said top and base portions and/or said partitioning means, i.e. the cam means should only act onto held cable portions. It is further preferred that said cam means acts as a guide means. Specifically, several cam means, in particular tilted cam means, may be used in order to properly align and guide the held cables. If said cam means is also or alternatively provided on said partitioning means, substantially the same results and effects as discussed above can be obtained.

Preferably, cam biasing means are provided for biasing, preferably spring biasing and in particular preferably adjustably spring biasing said cam means. By adopting such a design, cables can be held in the cable hold device in its locked position such that the held cables can be moved in one direction, i.e. said movement is inhibited in some or all other directions without requiring any work by an operator. In particular, by using adjustable cam biasing means, the force acting from said cam means onto said held cable(s), can be adjusted to an optimum value to prevent any scratching or damage of the held cables. Further, the use of cam means substantially increases the possibility of automation of, e.g. a cable hold device is desired which allows movement of the held cable only in one direction while inhibiting the relative movement thereof in all other directions. In particular, the force acting on the respective cables may independently be selected or adjusted so as to cope with different cable diameters and/or constitutions, or when simultaneously handling different cables or cable assembly.

Preferably, said cable hold device, in particular said top and base portions, said partitioning means and/or said cam means comprise surfaces, which at least partly mate with said accommodated cable and/or sleeve, for example surfaces having grooves with substantially semicircular cross section or another form corresponding to the outer diameter or profile of the held cables. It is to be noted that by providing inserts having corresponding semicircular surfaces, these respective surfaces can be adjusted to cables having different sizes and configurations.

The top and base portions of the cable hold device, said partitioning means and/or said cam means are preferably provided with corrugated or rubber coated surfaces having a large friction resistance. When using corrugated surfaces, it is in particular preferred that the corrugation has sawteeth-shape, such that the desired holding force is obtained with respect to one direction of movement of the held cables, while the friction is not enhanced or even reduced in the opposite direction. When using rubber coated surfaces, the protection of the held cables against damage can be further enhanced while providing improved movement restriction.

In the inventive cable hold device, the space or subspaces for accommodating respectively one cable or a group of cables is/are preferably independently adjustable in accordance with the size of the respective cable or cables and/or to the force imparted thereto, directly or via said tube or sleeve surrounding said cables. With this arrangement, the versatility of the cable hold device is substantially increased, as the guiding, holding and/or movement restricting abilities of the cable hold device can independently be chosen and/or adapted for any specific assembly or combination of cables to be held. Of course, some or all of the above features may be combined with each other in order to provide a cable hold device adapted to the specific needs.

The inventive apparatus for inserting and/or passing at least one cable into and/or through a part such as a grommet or connector having holes for accommodating said cable comprises a cable hold device according to the invention and/or having the preferred features. The apparatus further comprises a part hold device for holding said grommet or connector into or through which said one or more cables are to be inserted or passed through, substantially in line with the held portion of the cable or cables and actuation means for causing a relative movement of said cable hold device and said part hold device. Accordingly, with the apparatus of the present invention, automation is made possible and the ease of use is improved. The inserting and/or passing through of the one or more cables into or through said part, which can also consist of several subparts such as a connector or grommet can thus be carried out without causing any damage, scratching or deforming, in particular bending, of said one or more cables. In particular, when a long cable is to be passed through said grommet or connector, this is achieved in several steps. The amount of relative movement of said cable hold device and said part hold device is reduced so as to prevent bending or deformation of said cables between these two devices. The amount of relative displacement is preferably not more than 30 mm; this length is however dependent on the strength, type, etc. of said one or more cables. As actuation means, any suitable means may be used such as a simple hinge lever, a spindle, screw or ball screw means, hydraulic or pneumatic devices, etc. Further, it is also possible to bias said holding devices with respect to each other such that the relative movement caused by said actuation means is only required in one direction. In this case, the relative movement is preferably made in the direction of the insertion and/or passing of said one or more cables. It is to be noted that all features and advantages obtained by the different aspects of the inventive cable hold device are similarly applicable to the entire apparatus.

Preferably, said part hold device of the inventive apparatus is provided with positioning means for positioning said part such as a grommet or connector, such that the insertion can easily be performed. Said positioning means may be provided integrally at the location where said part is to be held, for example, in the form of a projection or pin. Alternatively, said positioning means can also be provided as a distinct or separate means for preliminarily arranging, positioning and/or inserting said one or more cables at or in said part. Said preassembled cable-part assembly is subsequently arranged in the cable hold device and said part hold device. The part hold device may generally have a similar construction to the cable hold device or any other known construction. In particular, the part hold device may comprise top and base portions, being hingedly connected with each other and defining a space for receiving said grommet or connector. The part hold device preferably further comprises spaces or openings for allowing said cables to have access to said part and to be passed through it. The part is preferably held in said part hold device without substantial play and in particular without any applied load. It is to be noted that identification and/or positioning marks may also be provided either on said part hold device or on said positioning means, in order to prevent the misorientation, misarrangement or misalignment of said one or more cables with respect to said part.

The inventive method of inserting and/or passing at least one cable into and/or through a part such as a grommet or connector comprises the steps of: holding said cable such that the movement thereof is restricted; and causing a relative movement of said part with respect to said held one or more cables in order to insert and/or pass the one or more cables into and/or through said part. In particular, the inventive method comprises the use of any of the preferred cable hold devices or apparatuses, as defined above. In this case the inventive method is suitable for surely inserting and/or passing one or more cables into or through a part without causing any damage to the involved cables, in particular without causing any deformation or bending of said cables. Further, with the inventive method, the possibilities of automation and the ease of use are enhanced and it has a wide range of applications, in that it can be used for inserting cables any into arbitrary chosen part having openings for accommodating them.

Preferably, when said at least one cable is at least partly surrounded by a tube or sleeve, the step of holding said cable is at least partly achieved by a force imparted to said sleeve to reduce or eliminate the force directly acting upon said cable, thus further enhancing the protection of said cables.

Finally, said step of holding said one or more cables are preferably one in which the movement is restricted in at least one direction, and in particular restricted in all directions but one. With such a step, the method can be considerably speeded up, thereby allowing further automation. Since the subsequent passage of said cable by a specified amount does not involve any need to operate or handle said cable hold device.

In summary, the invention provides a cable hold device, an apparatus and method of inserting and/or passing one or more cables into and/or through a part such as a grommet or connector, wherein the cables, in particular delicate cables such as polytetrafluorethylene resin coated cables, can be securely protected against any scratching, damage, deformation or bending. Further, enhanced possibility of automation and ease of use are achieved. Further, said part such as a grommet or connector is also protected against any damage, without necessitating any addition of oil or other lubricants. Also, a large number of cables, in particular cables prepared by semi-stripping ends thereof and/or being surrounded by one or more tubes or sleeves, can be handled simultaneously. The invention can be used for various purposes using different lengths, kinds, diameters, etc. of cables, wherein the burden of handling the tube or sleeve, in particular a glass fiber tube is reduced.

The above and further features and advantages will become apparent when reading the following description of preferred embodiments of the invention, only serving as examples and to be considered in connection with the accompanying drawings.

BRIEF DESCRIPTION OF THE DRAWINGS

FIGS. 1–5 are perspective views of a preferred embodiment of the inventive apparatus in different operational positions, including a first preferred embodiment of the inventive cable hold device.

FIG. 4a is a perspective view similar to FIG. 4, using however a second preferred embodiment of the inventive cable hold device.

FIGS. 7 and 8 are a perspective view and a side elevational view of a third preferred embodiment of the inventive cable hold device.

FIG. 8a is a detailed view showing an alternative partitioning plate to be used in the third embodiment.

FIG. 9 is a perspective view showing the cable hold device according to the third embodiment in combination with a second element of the apparatus, namely the grommet hold device and its relation to the held cables.

DETAILED DESCRIPTION OF THE PREFERRED EMBODIMENTS

Figure 1:
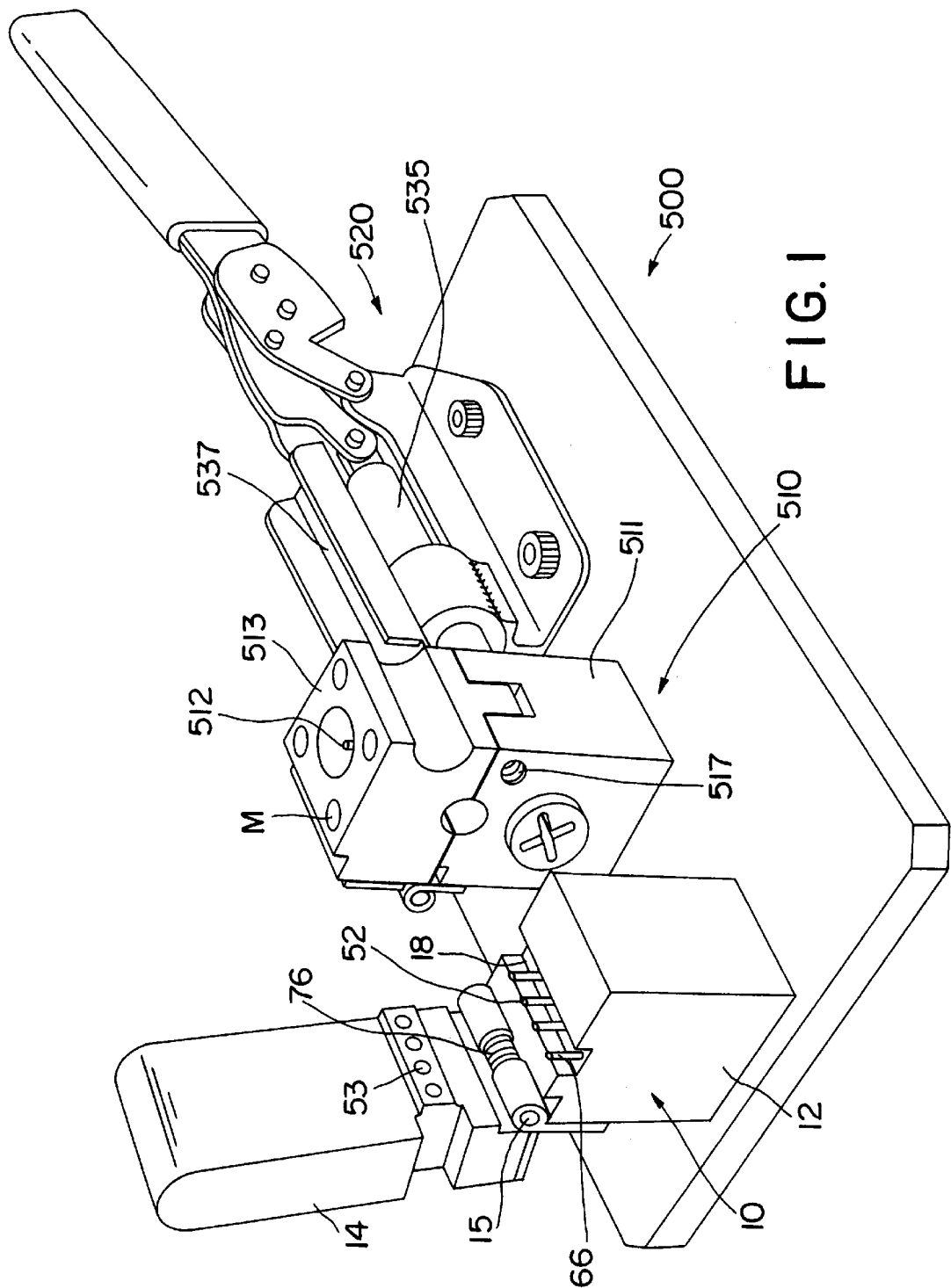

Next, a preferred embodiment of the inventive apparatus will be described with reference to FIGS. 1 to 5. The preferred embodiment of the apparatus comprises an actuation means 520 which is mounted on a base plate and comprises a swingable lever mechanism which is shown in FIG. 1 in the initial position. The actuation means 520 comprises a movable rod 535 and a cable guide section 526, which is provided with a cable length mark 537. At the end opposite to the actuation lever, the rod 535 is fixed to a part hold means 510 via a screw means 522. The part hold means 510 in the shown embodiment is a grommet hold device that is slidably arranged on the base plate so that it is linearly moved when the actuation lever is operated. It should be noted that the actuation means 520 could also be designed using various alternative options such as a hydraulic or pneumatic cylinder, an electric motor, a screw or other means in order to relatively move the grommet hold device 510 back and forth with respect to a cable hold device 10 which is also provided on the base plate, preferably on the opposite side to the actuation means 520 with respect to the grommet hold device 510. The different features and advantages of different usable cable hold devices will be described later on in this specification. It should however be noted that all features and advantages described later on will have a similar effect.

Figure 3:
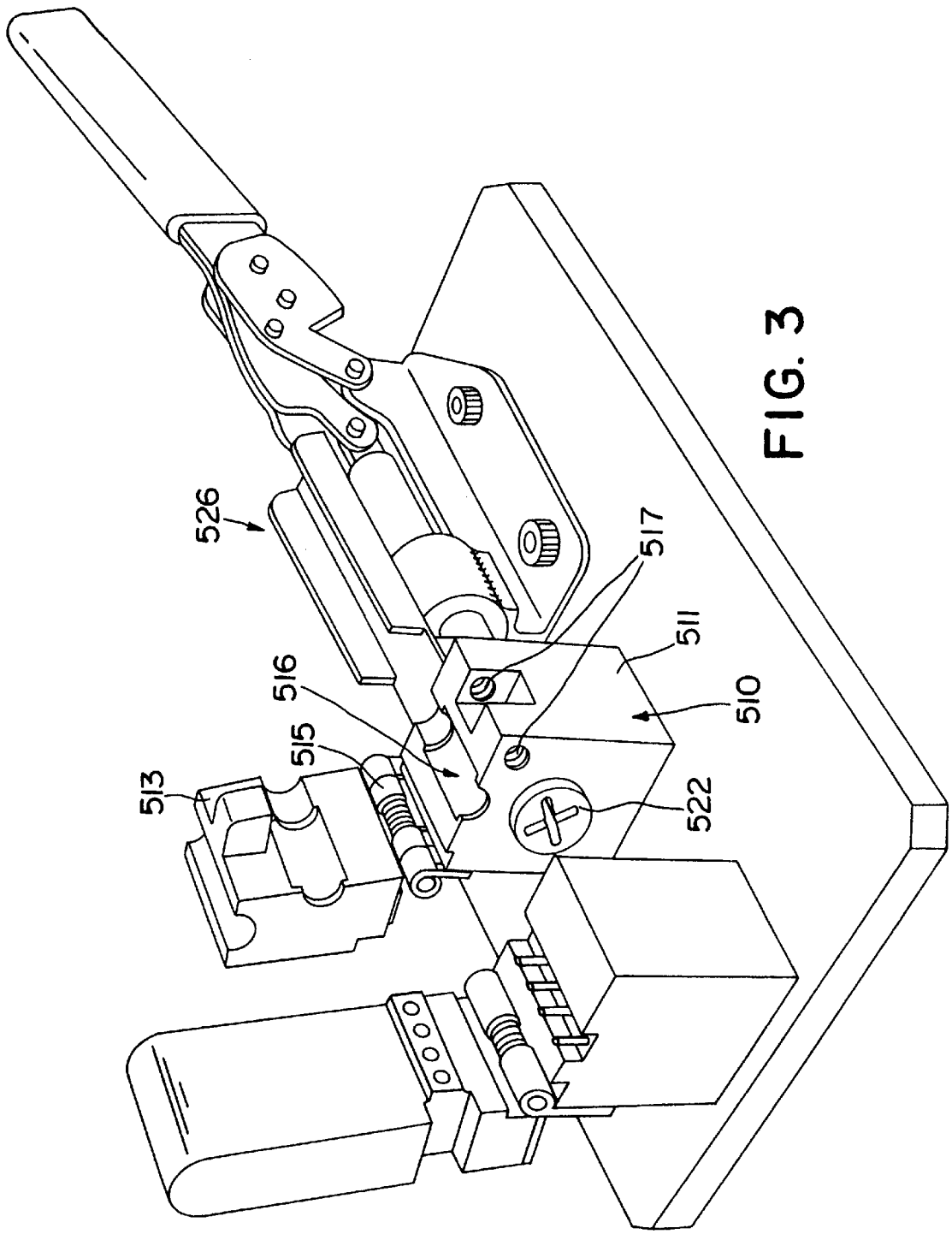

The grommet hold device 510 comprises a base portion 511 and a top portion 513. The base and top portions 511, 513 are connected with each other via a hinge 515 which is preferably a spring biased hinge as shown in FIG. 3. When the top and base portions 511, 513 are closed with respect to each other, they define between them a space 516 for accommodating a grommet 6 in such a way that the movement of the grommet 6 is restricted without clamping or deforming the grommet 6. Care should be taken not to deform the grommet 6 in order not to deform the openings therein for the insertion and passage of the cables C.

As shown in FIG. 1, the base portion 511 is provided with a threaded hole 517 for inserting a ball plunger which could serve to lock the grommet hold device 510 in the locked position. A simple alternative to the threaded hole 517 would be a simple bore for inserting a locking pin, provided that a corresponding counterpart be formed in the top portion 513. Although not shown in the figures, it is also possible to provide guide means such as a guide rail for guiding the relative movement of the grommet hold device 510. Of course, the back and front walls of the grommet hold device 510 are designed such that passage ways are formed for allowing the passage of cables C to be inserted and/or passed through the held grommet 6.

As shown in FIG. 3, the cable guide means 526 is preferably so provided as to abut against or integral with the grommet hold device 510 in order to accommodate and guide the cables C after their passage through the held grommet 6. Substantially in line to or flush with the opening in the side wall of the base portion 511 of the grommet hold device 510 is provided the cable guide means 526 mounted on the actuation means 520. This is the state shown in FIG. 3.

As shown in FIG. 1, the cable guide means 526 may also be provided with marks 537 for measuring the amount by which said cables C are passed through said grommet 6.

Figure 2:
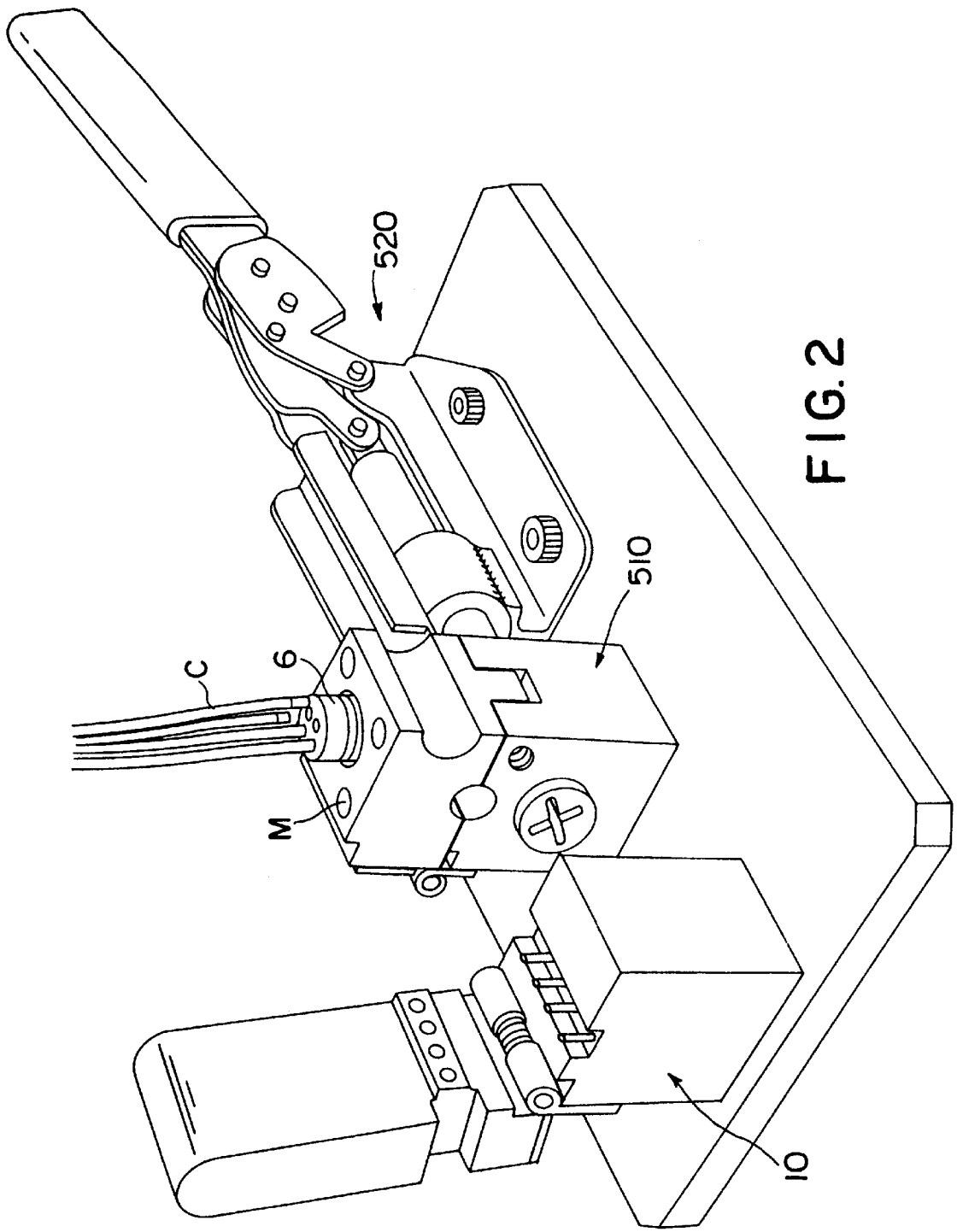
Figure 5:
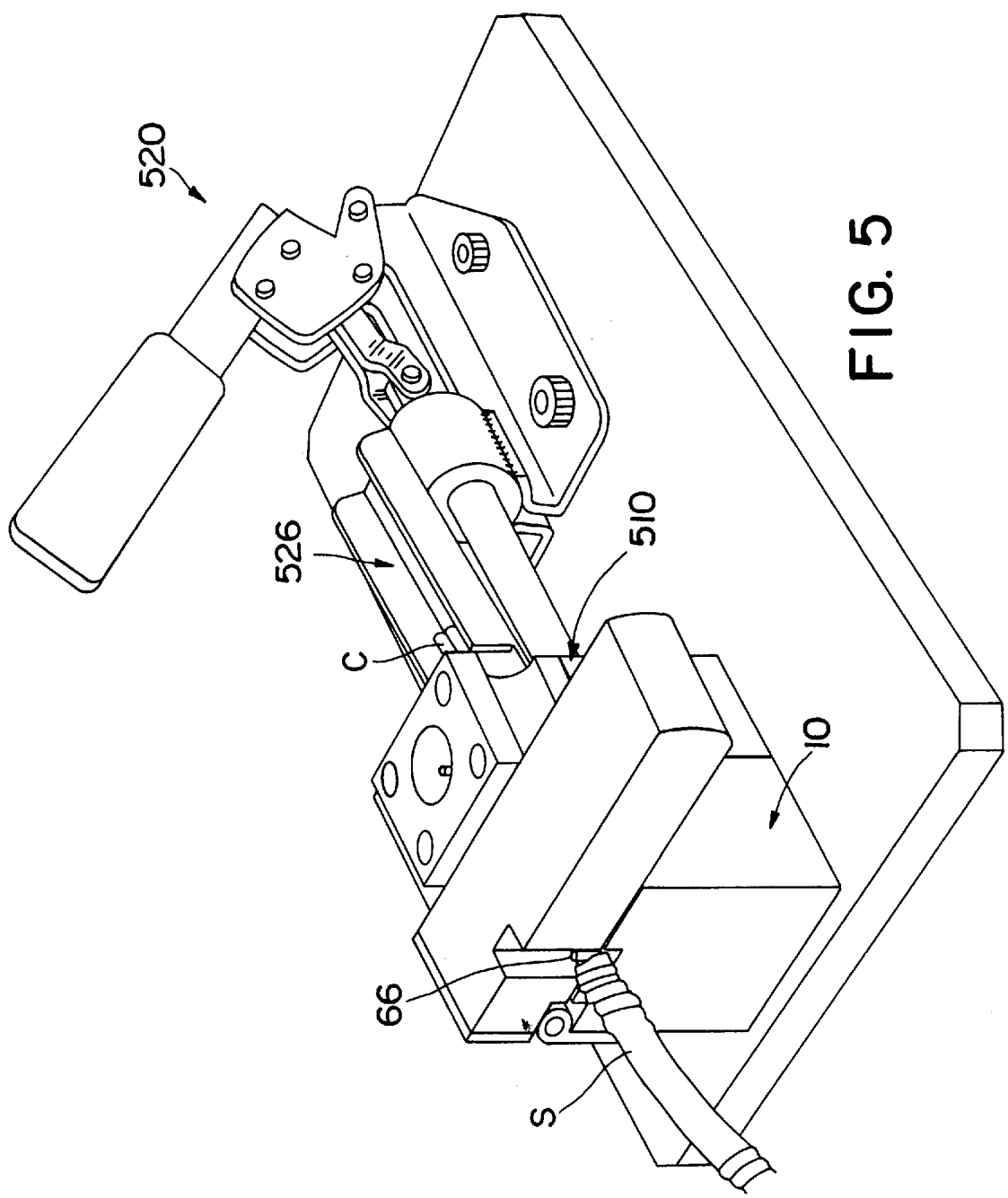

The cable C held by the cable hold device 10 can be arranged so as to be automatically inserted into the held grommet 6, as will be described later on in the specification with reference to FIG. 10. With the preferred embodiment of the apparatus, it is however also possible to perform a pre-insertion of the cable ends into the grommet 6. For this purpose, the top portion 513 of the grommet hold device 510 is provided with a recess for accommodating the grommet. The recess is provided with one or more positioning pins 512 in order to ensure proper alignment and positioning of the grommet 6 prior to the insertion of the respective cable C. On top of the top portion 513, there are also provided marks or indexing means M which could for instance represent the colors of the different cables C to be inserted into the grommet 6 which is accommodated in the recess, and which in particular is positioned and/or aligned by the positioning pin 512. After the pre-insertion of the cables C into the grommet 6 according to the indexing marks M as shown in FIG. 2, the grommet hold device 510 is opened as shown in FIG. 3 to accommodate the grommet 6 into which the ends of the cables C have been inserted. The cables C are partly surrounded by a sleeve S which is shown in FIG. 4 in a position before the cable hold device 10 and which is shown in FIG. 4a in an alternative embodiment of the cable hold device 10 as extending within the cable hold device 10. In any case, after having positioned the grommet 6 in the grommet hold device 510, the latter is closed together with the cable hold device 10, whereafter the lever of the actuation means 520 is operated in order to cause relative movement of the grommet hold device 510 with respect to the cable hold device 10, thus causing the passage of the cables C and the exiting thereof into the cable guide means 526, as shown in FIG. 5. The detailed operation of the preferred apparatus and further features thereof will become apparent upon reading the description of the preferred embodiments of the inventive method to be described later.

Next, a first preferred embodiment of the inventive cable hold device will be described in detail with reference again to FIGS. 1 to 5. The cable hold device 10 of this embodiment comprises a base portion 12 and a top portion 14. The top and base portions 14, 12 are connected with each other by a hinge 15. The upper surface of the base portion 12 is formed with a recess which defines a space 18 for accommodating cables C, when the top and base portions 14, 12 are closed with respect to each other. In the shown embodiment, the space 18 is divided into subspaces by vertically extending pins 52. Alternatively, the space 18 could also be divided by another vertically extending partitioning means such as a partitioning plate. The pins 52 are fixed to the base portion 12, wherein accommodating recesses 53 are formed in the top portion 14 of the cable hold device 10. By providing the recesses 53, the relative movement of the top and base portions 14, 12 is not interfered with by any interaction of the pins 52 with the top portion 14.

Further to the partitioning means comprised by the pins 52, there is provided a sleeve retaining means, which is comprised by a pin 66 projecting from the base portion 12 substantially parallel and in line with respect to the partitioning pins 52. As clearly shown in FIG. 5, the sleeve retaining pin 66 inhibits the sleeve S as from entering the space 18. The function of the partitioning pins 52 can be clearly seen in FIG. 4 in which two cables C are shown in each of the subspaces defined by the partitioning pins 52. Accordingly, the restriction of the movement of the accommodated cables C is performed by the action of the base portion 12 on the lower two cables C in the respective subspaces and by the action of the top portion 14 on the upper two cables. Thus, a load imparted by the closing of the top and base portions 14, 12 does not cause any movement of the accommodated cables C, as these cables C are accommodated substantially without any play in the subspaces defined by the partitioning pins 52. Preferably, the pins 52 and the recesses 53 are surrounded by a member having a large frictional resistance which is made of, e.g. rubber, such that the movement restriction can be performed by the application of only a small force or load for closing the top and base portions 14, 12 with respect to each other.

The hinge 15 preferably comprises a spring 76 for biasing the top and base portions 14, 12 with respect to each other. The top and base portions 12, 14 are biased to their opened position, so that, upon the release of a biasing force, the upper portion 14 is returned to its opened position. Alternatively, the biasing means, i.e. the spring 76, may bias the top and base portions 14, 12 in their closed position, such that an operator has to counteract the force of the spring 76 in order to arrange the cables C in the cable hold device 10, whereafter the cables C are automatically held by the load imparted by the spring 76.

As an alternative embodiment, the cable hold device 10 may also be designed so as to partly accommodate the sleeve S surrounding the cables C. In this case, it is of course only possible to provide any partitioning means at a portion of the cables C which is not surrounded by the sleeve S. It is to be understood that when partitioning means are also provided in this embodiment, these could also serve as a sleeve retaining means preventing the sleeve S from further entering the cable hold device 10 or from further passing through the cable hold device 10. In the embodiment shown in FIG. 4a, the top portion 14 is provided with a member 20 having a large friction resistance which is provided for imparting a force on the sleeve S accommodated in the space 18 upon closing of the top and base portions 14, 12 with respect to each other. Accordingly, there is no direct impact onto the accommodated cables C, as the sleeve S is interposed between the cables C and the cable hold device 10. Although not shown, the space 18 and/or the friction plate 12 preferably have a tapered or stepped surface as a sleeve retaining means such that the sleeve S and the cables C are accommodated in respective portions of the space 18 substantially without any play. In such a configuration, it is possible to perform the cable movement restriction exclusively by a force imparted onto the sleeve S as mentioned above, or alternatively to essentially perform the cable movement restriction by a force imparted by the closing of the top portion 14 via the member 20 onto the sleeve S, supplemented by a small amount of force directly imparted onto the cables C at a portion where they are not surrounded by the sleeve S.

In FIGS. 7 and 8, a third preferred embodiment of the inventive cable hold device is shown, also comprising top and base portions 14 and 12, which are connected with each other by a hinge 15. The hinge 15 may, as in the previous embodiments, be spring-biased. In the third embodiment, the base portion 12 is provided with substantially semicircular recesses or grooves 84, defining between them a vertically extending partitioning projection 54. The top portion 14 is constructed accordingly, i.e. also comprises substantially semicircular recesses 84 defining a partitioning projection 54 between them. In the shown embodiment, there is also provided a partitioning plate 58 which extends substantially horizontally in the closed position of the top and base portions 14, 12. The partitioning plate 58 is also hinged at the hinge 15, i.e. at the same hinge point as the top and base portions 14, 12. In this embodiment, it is further possible to provide semi-annular shaped inserts in order to allow a specific adaptation of the cable hold device to different diameters of cables C to be held, i.e. to different diameters of the cables C each comprised of a cable core and a coating thereof.

As can be seen in FIG. 8, when said top and base portions 14, 12 are closed with respect to each other, with the partitioning plate 58 being interposed there between, there are defined four definite subspaces 62 which each accommodates one cable C. In order to further prevent any deformation of the cables C accommodated in the subspaces 62, it is also possible to provide corresponding recesses 82 in the partitioning plate 58 as shown in FIG. 8a. Accordingly, by providing one subspace 62 for each cable C, the movement restricting ability can be adjusted by designing the respective subspaces 62 so as to provide different movement restriction for different held cables C. Further, as the form of the subspaces 62 substantially corresponds to the sectional form of the held cables C, any deformation of the cables C is avoided, resulting in a better protection of the held cables against any damage or deformation.

In FIG. 9, the above-mentioned cable hold device 10 is shown while holding four cables C in the respective subspaces 62 after the relative movement of the grommet hold device 510 with respect to the cable hold device 10.

In the above-mentioned embodiment, since each cable C is properly held and positioned, it is also possible to use this cable hold device 10 for inserting the ends of the cables C into the grommet 6 held in the grommet hold device 510. In FIG. 10, this state is shown, wherein the cable hold device 10 and the grommet hold device 510 are shown in a partly broken away side elevational view. The cable hold device 10 substantially corresponds to the one shown in FIGS. 7 and 8. The ends and edges of the cable hold device 10, which is located on the opposite side with respect to the grommet hold device 510, are rounded in order to provide further protection for the held cables C. Further, the sleeve retaining means 66, which are in particular rounded or tapered portions, are also provided as contact surfaces for retaining an unillustrated sleeve or tube. As is clearly shown in FIG. 10, the cables C are properly aligned with the openings in the grommet 6, such that it is sufficient to cause a relative movement of the cable hold device 10 and the grommet hold device 510 in order to introduce the cable ends C into the grommet 6. Accordingly, the step of preliminarily inserting the cable ends into the openings of grommet 6 can be omitted.

Figure 11:
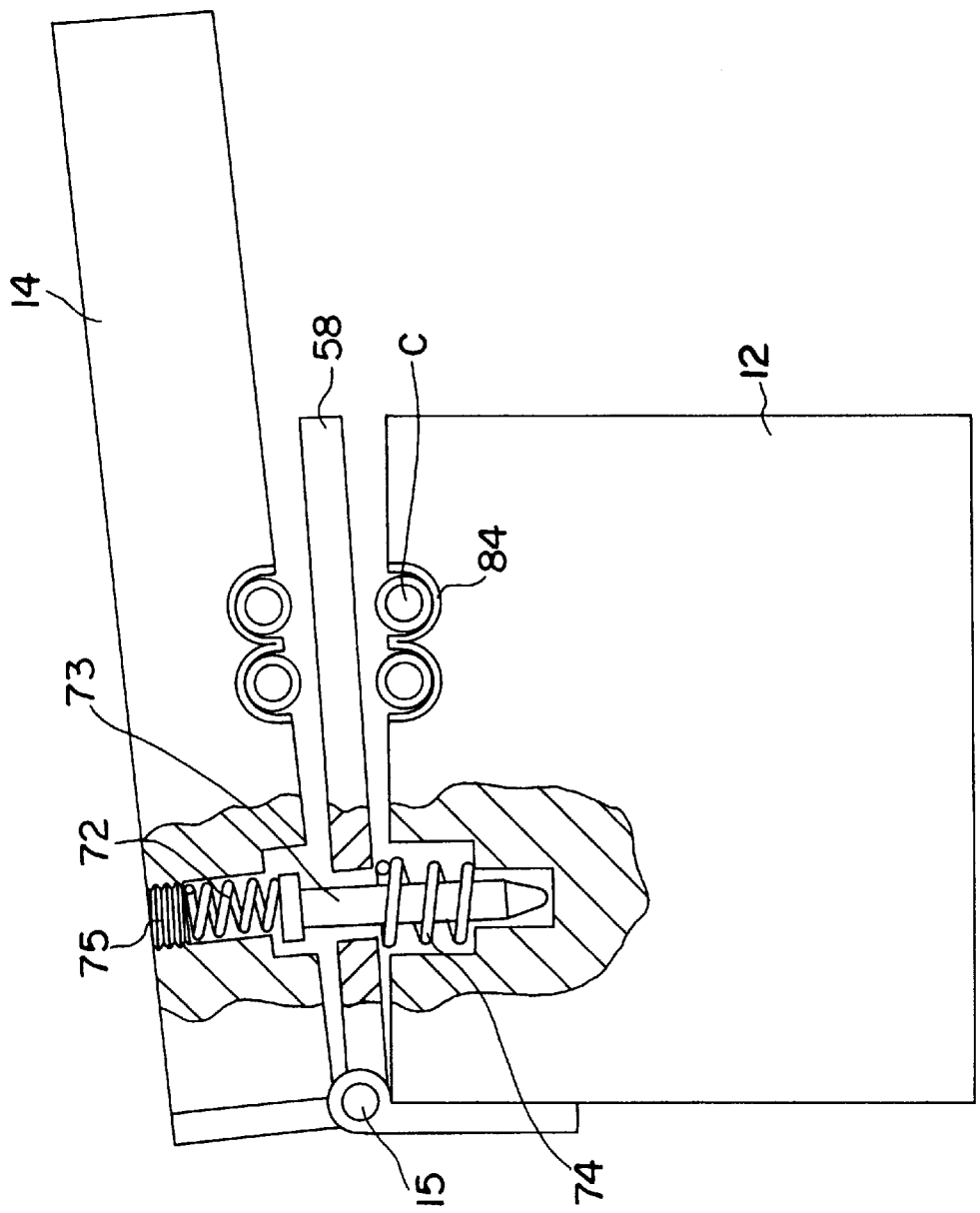
FIGS. 11 and 12 are partly broken away side elevational views of a supplementary biasing means to be used with the third embodiment in two different operational positions.
Figure 12:
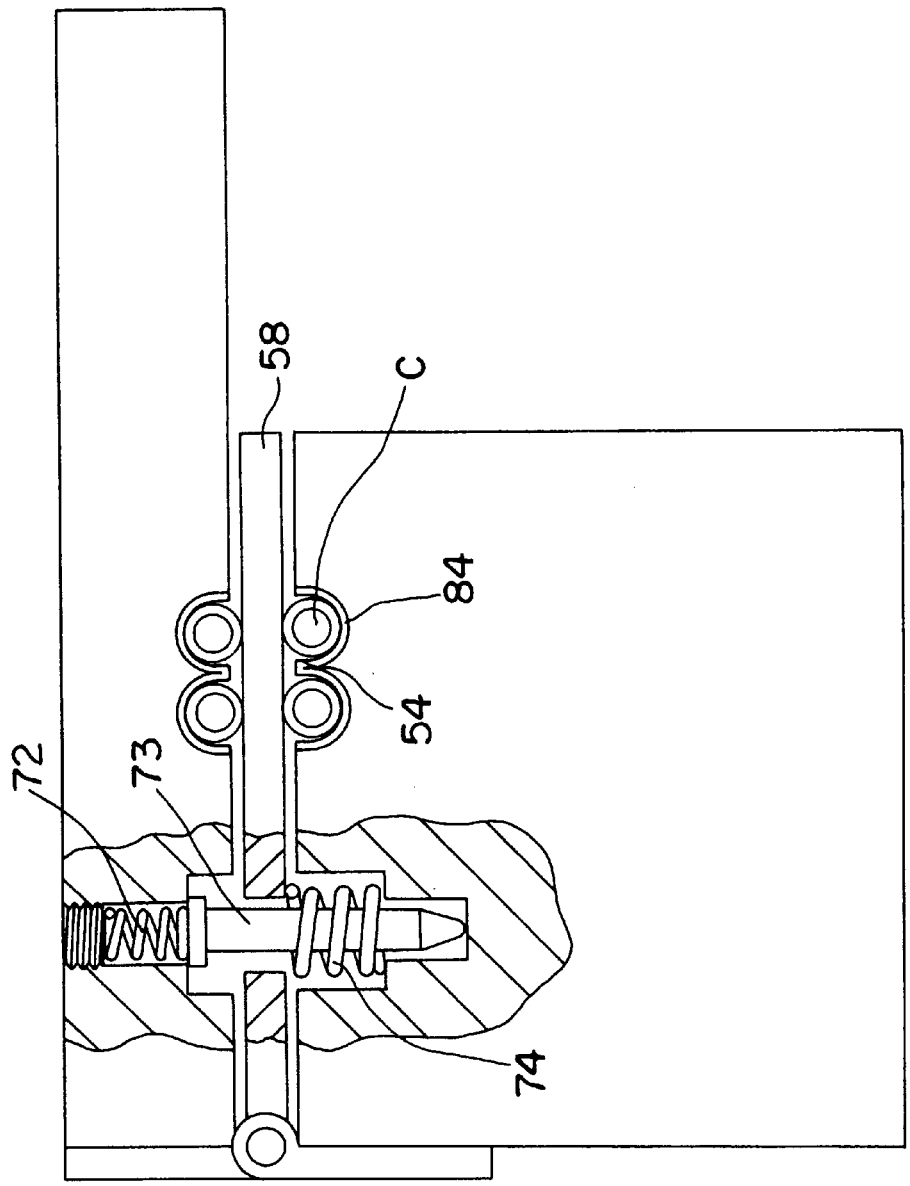

Further to the biasing means incorporated into the hinge 15, it is also possible to provide an adjustable biasing means for biasing the top and base portions 14 and 12 with respect to each other and with respect to the partitioning plate 58. This advantageous feature is shown in FIGS. 11 and 12, in which a cable hold device 10 is shown in a partly broken away side elevational view showing the details of the supplementary biasing means. The supplementary or a tentative biasing means is comprised, in this embodiment, of a pin 73 extending through an opening formed in the partitioning plate 58. In a recess formed in the base portion 12, there is provided a spring 74 surrounding the pin 73 for biasing the partitioning plate 58 with respect to the base portion 12. Above the pin 73 there is provided a second spring 72 which is adjustably received in a recess formed in the top portion 14. The upper end portion of the pin 73 is formed with a flange so as to urge the partitioning plate 58 to its closed position. Thus, either by adjusting the spring load of the spring 72 by a screw 75 provided for that purpose, or by setting specific spring loads for the springs 72 and 74, it is possible to precisely adjust the force imparted onto the respective cables C accommodated in the recesses 84 defining the subspaces 62. Accordingly, the springs 72, 74 can translate the load imparted onto the top portion 14 into preselected forces which will act on the respective upper and lower cables C.

The springs 72 and 74 can also act to cancel the movement restriction of the held cable C upon releasing a force or load imparted onto the top portion 14 as shown in FIG. 11. FIG. 12 shows four cables C having their movement restricted by being firmly held in the respective subspaces 62 defined by the recesses 84. Upon releasing the closing force of the top portion 14, the cable hold device 10 is automatically brought into the configuration or state shown in FIG. 11. In this state, the cables C are still accommodated and guided in the respective recesses 84, but without any load imparted thereon. Thus, they can be moved in the direction in which the cables C extend.

Figure 13:
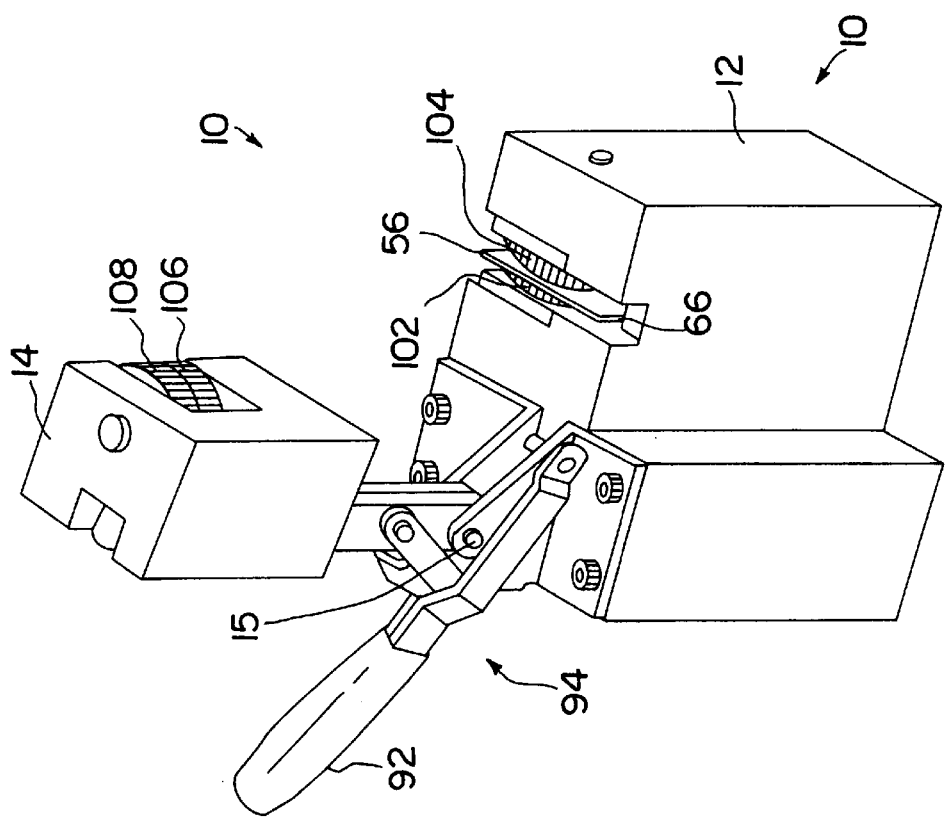
FIG. 13 is a perspective view showing a fourth preferred embodiment of the inventive cable hold device in an open state.

In FIG. 13, there is shown a fourth embodiment of the cable hold device 10 on its opened state. This cable hold device 10 comprises, as in the above-mentioned embodiments, top and base portions 14, 12 which are connected with each other by a hinge 15. The cable hold device 10 is further provided with a locking means 94 which can be actuated by a lever 92. As in the above embodiments, in the closed state, the top and base portions 14, 12 define a space for accommodating one or more cables between them. The space for accommodating the cables C is again partitioned by a partitioning plate 56 which extends substantially vertically in the shown embodiment. One end of the partitioning plate 56 is formed with a contact surface 66 acting as a sleeve retaining means for preventing a sleeve from further entering the space. The upper and lower surfaces of the space for accommodating the cables C are formed by the surfaces of eccentric cam means 102, 104, 106, 108. The base portion 12 is provided with two eccentric cam means 102 and 104, respectively provided on either side of the partitioning plate 56. The top portion 14 is provided with corresponding eccentric cam means 106, 108 to oppose the eccentric cam means 102, 104 of the base portion 12 when the top and base portions 14, 12 are in the closed position.

Figure 14:
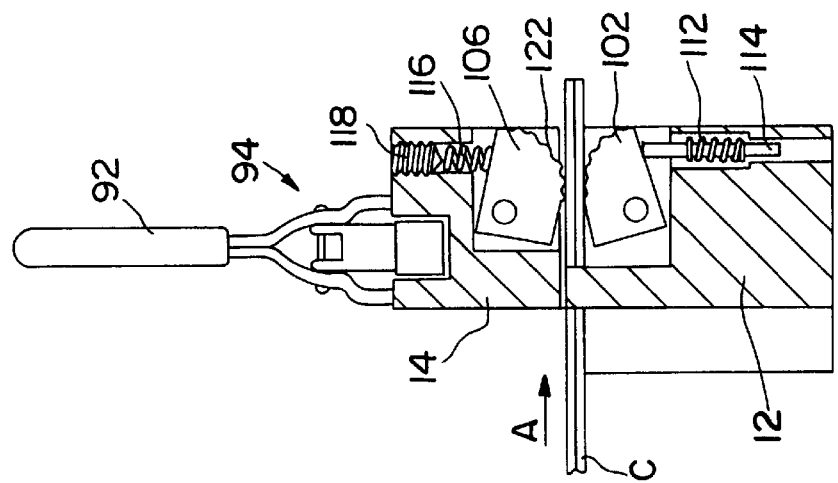
FIG. 14 is a sectional view of the embodiment shown in FIG. 13 in the closed state.

In FIG. 14, the cable hold device 10 of FIG. 13 is shown in a sectional view, showing the details of the eccentric cam means 102 and 106 of the base portion 12 and the top portion 14, respectively. In FIG. 14, the cable hold device 10 is in the closed and locked position, i.e. the locking mechanism 94 is closed and the lever 92 is in the upright position. In the space defined by the top and base portions 14, 12, two cables C are held. The eccentric cam means 102 of the base portion 12 is supported on an axis and is spring-biased upwardly by a spring-loaded pin 114 which is surrounded by a spring 112. The upper surface of the eccentric cam means 102 is corrugated in order to enhance the frictional engagement with the accommodated cables. Although not illustrated, it is preferred that the upper surface have a sawteeth-shape and/or be coated with rubber in order to provide a large degree of friction against relative movement in a direction opposite to the arrow A, while providing relative small frictional force during movement of the cable C in the direction of the arrow A.

Similar to the base portion 12, the top portion 14 is also provided with an eccentric cam means 106 supported on an eccentric axis. The eccentric cam means 106 is constructed substantially similar to the eccentric cam means 102. The eccentric cam means 106 is spring-biased in the downward direction by a spring 116. The spring load of the spring 116 is adjustable by a screw 118 provided above the spring 116 in the top portion 14. The upper eccentric cam means 106 acts in the shown embodiment on the upper cable C in a substantially similar way to the lower eccentric cam means 102. As seen from FIG. 14, the cables C are accordingly allowed to move in the direction of the arrow A, while the movement thereof is inhibited in the reverse direction. Accordingly, this preferred cable hold device 10 can advantageously be used when several strokes are required for passing the held cables C through a grommet.

Further features, advantages and objects of the above-described apparatus and devices will become more apparent upon reading the following description of the use thereof and of preferred embodiments of the inventive method.

Firstly, the operation of the apparatus 500 and the cable hold device 10 shown in FIGS. 1 to 5 will be described in detail.

In a first step, the apparatus 500 is brought into the state shown in FIG. 1. In this state, the cable hold device 10 is opened. The grommet hold device 510 is closed, such that the marks M and the positioning pin 512 provided on the top portion 513 are directed upwardly. The actuation means 520 is in the unoperated state, i.e. the grommet hold device 510 is remote from the cable hold device 10.

In a second step, the grommet 6 is arranged in the recess formed in the top portion 513 of the grommet hold device 510, such that one specific opening of the grommet 6 is engaged by the positioning pin 512. A small space must be left in the through holes of the grommet 6 even after the insertion of the positioning pins 512 thereinto to allow the insertion of the ends of respective cables C. In order to prevent any misalignment or wrong insertion of the cables C into the respective openings of the grommet 6, marks or indexing marks M are provided at corresponding positions of the top portion 513 around the recess. Preferably, the cables C are only inserted by a little amount into the grommet 6. After having manually preinserted the cable ends into the grommet 6 (state shown in FIG. 2), the grommet 6 is removed from the recess of the top portion 513.

In the next step, the top portion 513 of the grommet hold device 510 is opened, thus giving access to the space 516 for accommodating the grommet 6.

Afterwards the preassembled grommet 6 and the cables C are arranged in the grommet hold device 510 and the cable hold device 10. It is to be noted that the sleeve S is arranged to lie outside of the cable hold device 10. The cables C are arranged in the space 18 defined by a recess formed in the base portion 12 of the cable hold device 10. In particular, as shown in FIG. 4 the cables C are accommodated in the space 18 while being divided into groups by the partitioning pins 52 and the sleeve retaining pin 66. It is obvious that pins could also be replaced by a partitioning plate having the same function. In FIG. 4, two cables C are shown arranged on each side of the partitioning pins 52 in the subspaces 62.

After the arrangement of the preassembled grommet-wire-sleeve assembly, the respective top portions 513 and 14 are closed either manually or by the biasing action of the biasing means 76. After having closed the cable hold device 10 and the grommet hold device 510, these are pressed together by a manual force and/or locked in the closed position, for example, by threadingly inserting an unillustrated ball plunger fitted into the threaded bore 517. Once the cable hold device 10 and the grommet hold device 510 are closed, the lever of the actuation means 520 is moved in order to cause a relative movement of the grommet hold device 510 to the cable hold device 10.

In the shown embodiment of FIG. 5, the grommet hold device 510 is slidably moved towards the cable hold device 10. As the movement of the cables C is restricted by the cable hold device 10, in particular in the direction corresponding to the movement of the grommet hold device 510 or the direction in which said cables C extend, the cables C are passed or urged through the grommet 6 held in the grommet hold device 510. After having passed through the grommet 6, the cables C exit through the passage way of the grommet hold device 510, while being guided by the cable guide means 526. In the case of polytetrafluoroethylene resin coated cables, it is absolutely necessary to prevent any damage or deformation of the cables. It is therefore necessary on the one hand to reduce the amount by which the cables C are passed through the grommet 6 by one stroke to a maximum of 30 mm and on the other hand to select a force for restricting the movement of the cables held in the cable hold device 10 as small as possible to ensure that the cables C are not displaced within the cable hold device 10 during the relative movement of the grommet hold device with respect to the cable hold device 10.

After this first stroke of the actuation means 520, the cable hold device 10 is partially released so as to still guide and accommodate the cables C in the space 18 provided therefor, whilst yet allowing a movement of the cables C in the direction in which the cables do extend. Accordingly, when the lever of the actuation means 520 is returned to its initial position, the cables C are pulled through the cable hold device 10 by the relative movement of the grommet hold device 510 away from the cable hold device 10. In this context, it has to be noted that the frictional load of the cables C within the grommet 6 shall be larger than the force acting on the cables C by the cable hold device 10 in the direction opposite to the direction of movement of the grommet hold device 510. Alternatively, it is also possible to increase the frictional force between the cables C and the grommet 6 by further imparting a force onto the top portion 513 of the grommet hold device 510. In any case, the cables C are to be pulled through the cable hold device 10, wherein the sleeve S surrounding the cables C is prevented from entering the cable accommodating space 18. This is the state shown in FIG. 5, in which the grommet hold device 510 has begun its movement back to its original position. Once the grommet hold device 510 has reached its initial position, the movement of the cables contained in the cable hold device 10 is restricted again in order to allow a subsequent stroke of the actuation means 520 to further pass the cables C through the grommet 6. The above steps are repeated until the cables C reach the mark 537 in the cable guide means 526.

The operation of an apparatus including the second embodiment of the cable hold device 10 as shown in FIG. 4a is substantially similar to that of the above apparatus regarding the preassembly, the assembly and the stroke of the actuation means 520. However, as shown in FIG. 4a, the cable hold device 10 is intended to at least partly accommodate the sleeve S therein. Thus, when the top and base portion 14, 12 of the cable hold device 10 are closed with respect to each other, the movement restriction of the cables C is obtained at least partly by imparting a force onto the sleeve S surrounding the cables C in the cable hold device 10. As the sleeve S is interposed between the cable hold device 10 and the held cables C, the cables C are better protected against scratching or crunching. In this embodiment, the space 18 for accommodating the sleeve S and the cable C and/or the member 20 having a large frictional resistance which acts on the sleeve S may be so designed as to have a stepped or tapered surface in order to restrict the movement of the sleeve S independent of whether the top and base portions 14, 12 are fully closed, loaded, biased or not. Further, by using a tapered or stepped configuration, it is also possible to sustain the action of restricting the movement of the cables via the sleeve S in the same manner as when a force directly acts on the cables C. It is to be noted that an additional partitioning pin may also be provided for preventing any sleeve movement. In such a case, the partitioning pins should of course be located at a portion of the space 18 which is designed not to accommodate the sleeve S, but solely the cables C.

Figure 6:
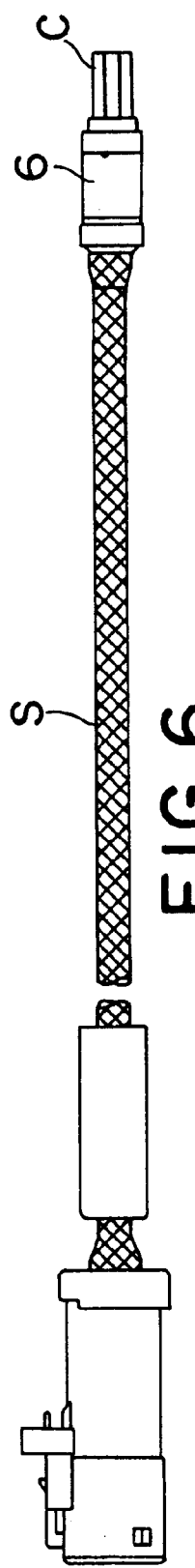
FIGS. 6 and 6a shows a cable assembly in two different states, namely showing the difference of the cable assembly state before and after one actuation of the preferred embodiment of the inventive apparatus.
Figure 6A:
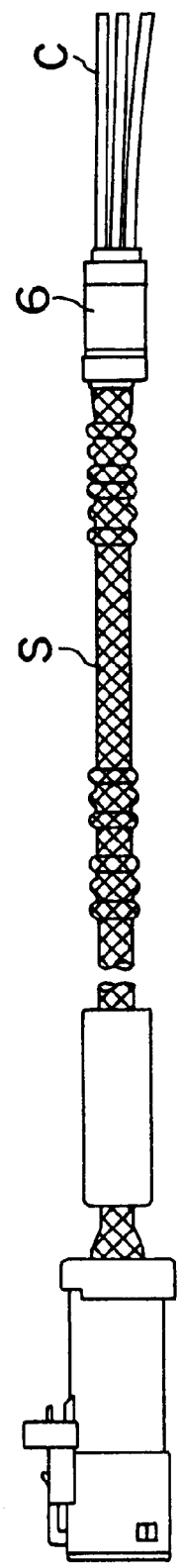

In FIGS. 6 and 6a, a specific cable assembly is shown after the first stroke and after the second stroke, respectively after the removal from the inventive apparatus and/or cable hold device 10.

In the following, the operation of the third embodiment of the inventive cable hold device shown in FIGS. 7 through 12 and the use thereof in a preferred apparatus will be described in detail. With the shown cable hold device 10, it is not necessary to preassemble the cables C and the grommet 6, i.e. to insert the ends of the cables C into the grommet 6 in advance. Thus, a first step consists of arranging the grommet 6 into the grommet hold device 510. In a subsequent step, the different cables C are arranged in the cable hold device 10. In particular, the cables are arranged in the cable hold device 10 according to marks M provided on one side wall of the cable hold device 10. In order to arrange the cables C in the cable hold device 10, the latter is opened by opening the hinge top portion 14 and the partitioning plate 58 hinged to the same hinge 15. In the opened state, the two lower cables C are arranged in the recesses 84 of the base portion 12. Afterwards, the partitioning plate 58 is closed with respect to the base portion 12, thus defining subspaces 62 in which the two lower cables C are accommodated. Afterwards, the two upper cables are either arranged on the upper surface of the partitioning plate 58, in particular in the recesses 82 formed therein, or in the recesses 84 formed in the top portion 14. After having arranged all four cables C in accordance with the marks or indexing marks, for instance color marks M, the top portion 14 is closed with respect to the base portion 12 and the partitioning plate 58. Accordingly, all four cables C are each accommodated in a specific subspace 62, which substantially corresponds to the outer shape of each accommodated cable. Thus, when any load is applied to the top portion 14, the respective cables C contained in the respective subspaces 62 are restricted in their movement, substantially in all directions, in particular in the direction in which said cables C extend.

In one particularly preferred embodiment, the respective subspaces 62 are provided with a rubber coating made of, e.g. the rubber composition of the grommet 6 through which the cables C are to be inserted. In order to fulfill the requirement for a minimal force for restricting the movement of the cables C held in the cable hold device 10, the extent over which the cables C are held substantially corresponds to the length of the grommet 6. Accordingly, the frictional force acting onto cables passed through the grommet 6 substantially corresponds to the frictional force acting on the cables C by the cable hold device 10. Thus, when it is desired to restrict the movement of the cables C, it is sufficient to apply a minimum load to the cable hold device 10 in order to increase the amount of frictional force of the cable hold device 10 with respect to the cables C to above the frictional force acting on the cable C in the grommet 6. When the cables C surrounded by a sleeve are used, the eventual restoring force of the sleeve must be additionally considered. Thus, during the relative movement of the grommet hold device 510 to the cable hold device 10, it is not necessary to apply any large load for clamping the cables C, and the cables C are thus protected against any damage.

Figure 10:
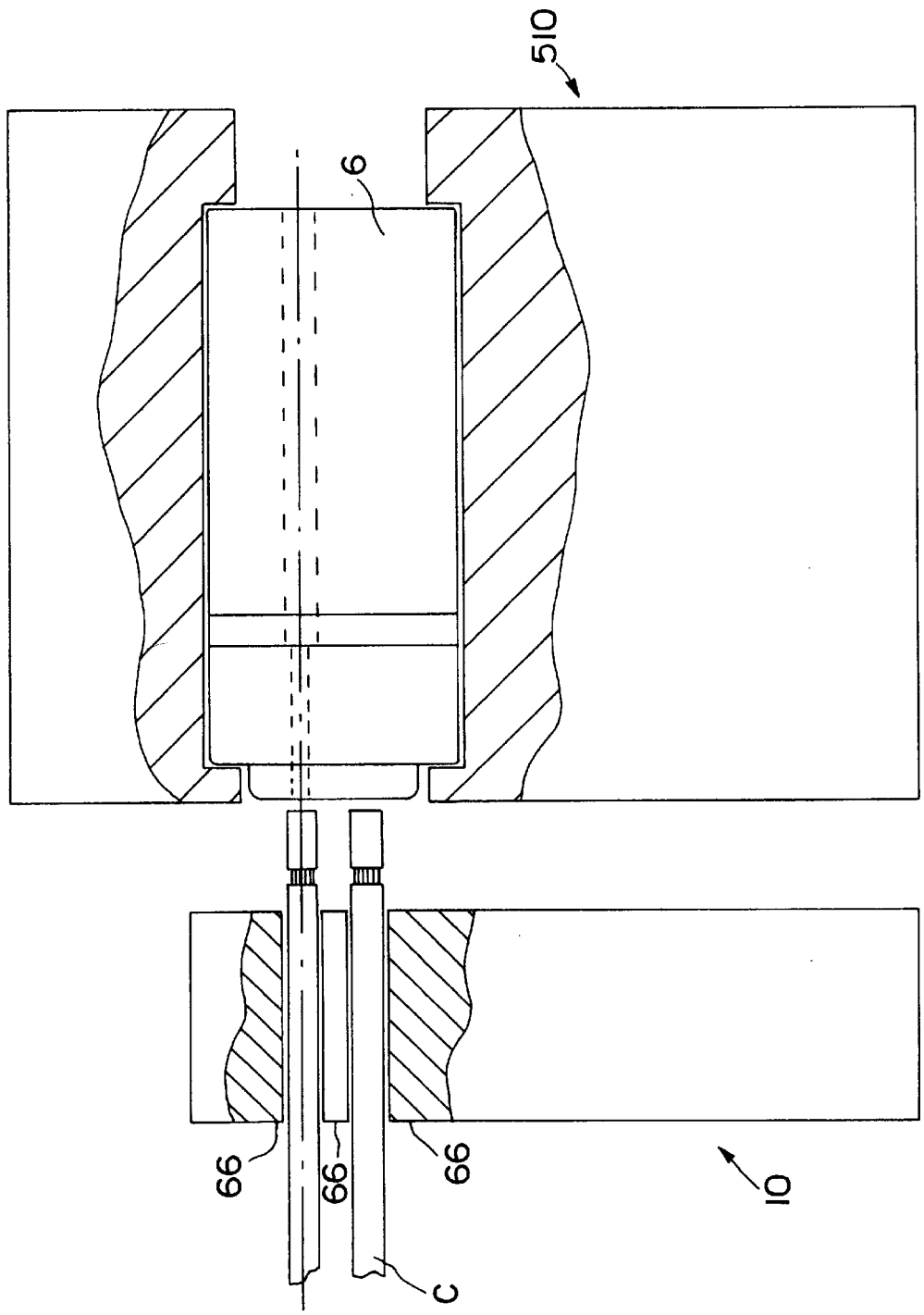
FIG. 10 is a sectional view of the embodiment of FIG. 9.

As shown in FIG. 10, the cables C are properly aligned with respect to the openings of the grommet 6, thereby allowing direct insertion of the ends of the cables C into the held grommet 6. Preferably, the ends of the recesses accommodating the cables C in the cable hold device 10 are rounded or tapered in order to allow smooth movement of the cables C when the movement thereof is not restricted. One will evidently recognize that the partitioning plate 58 can also serve as a sleeve retaining means, as the partitioning plate 58 is extending between groups of cables which are integrally surrounded by a sleeve. When using different kinds of cables, it may be suitable to use the biasing means shown in FIGS. 11 and 12 which allows a selective movement restriction of the upper and/or lower group of cables by using a correspondingly preselected spring 74 or by adjusting the spring load of the spring 72 by a screw 75. The state shown in FIG. 11 is the state in which the cables C are slidably received in the recesses 84 without any force acting on them. Accordingly, the cables C can be pulled through the cable hold device 10 during the movement of the grommet hold device 510 away from the cable hold device 10.

FIG. 12 shows the state of the preferred embodiment of the cable hold device which restricts the movement of the accommodated cables C during the relative movement of the grommet hold device 510 with respect to the cable hold device 510 in order to insert and/or pass the held cables C through the held grommet 6. By selecting different spring loads for the springs 72, 74, it is possible to restrict the movement of the lower cables C more than that of the upper cables C when, for example, the lower cables C are less delicate or are coated with a coating having a lower frictional coefficient, so as to obtain a more protective or more uniform movement restriction of all accommodated cables.

Next, there will be described the use of the fourth preferred embodiment of the inventive cable hold device and its use in the inventive apparatus and/or in connection with the inventive method. Similarly as in the foregoing embodiments, this cable hold device 10 can also be used with a preinserted or preassembled cable-grommet-assembly as well as with separate cables and grommet.

The cables C are arranged in the opened cable hold device 10, in particular on both sides of the partitioning plate 56. The lowermost cables rest on the upper surfaces of the eccentric cam means 102 and 104, respectively. Afterwards the lever 92 is actuated to close the top portion 14 with respect to the base portion 12, wherein the locking mechanism 94 is brought into the locked state. Accordingly, the eccentric cam means 106 and 108 of the top portion 14 are brought into contact with the uppermost cables, achieving the state of FIG. 14. Alternatively, it is also possible to first bring the cable hold device 10 into the closed and locked position and to insert the cables C afterwards from this side opposite to the grommet hold device 510. Upon insertion of the cables C, the eccentric cam means are urged out of the passage way, in the upward and downward direction, respectively. As the eccentric cam means allow a relative movement of the cable C contacting the surface, in particular the corrugated surface of the eccentric cam means in the direction indicated by the arrow A in FIG. 14, it is not necessary to perform any action with respect to the cable hold device 10 during the successive operations of the actuation means 520. In particular, when bringing the grommet hold device 510 closer to the cable hold device 10, the relative movement of the cables C in a direction opposite to the arrow A causes a small amount of rotation of the eccentric cam means, thus enhancing the force acting on the cables C by the eccentric cam means. Accordingly, in the embodiment shown in FIGS. 13 and 14, the cable hold device 10 is provided with an automatic adjusting function of the cable restriction such that the force imparted to the cables C is as small as necessary for allowing the passage of the cables C through the grommet 6 during the step of approaching the grommet hold device 510 to the cable hold device 10. During the step of pulling the cables C through the cable hold device 10, it is not necessary to release a force for restricting the movement of the cables C, as this is automatically achieved by a small rotation of the eccentric cam means for simply allowing the movement of the cables C in the direction of the arrow A.

Although the embodiment described with reference to FIGS. 13 and 14 includes one eccentric cam means per cable, it is also possible to provide one single cam means which achieves substantially the same function for the entire group of cables accommodated between top and base portions 14 and 12. Likewise, It is also possible to provide respectively two or more cam means for each cable C. However in view of the reduced production cost and simplicity of the cable hold device 10, the described and illustrated embodiment is actually a preferred one.

Although different features and aspects of the inventive cable hold device, apparatus and method have been described, various modifications of different features of the different embodiments may be freely combined with each other. For example, the embodiment shown in FIGS. 13 and 14 may also be supplementarily provided supplementarily with a partitioning plate 58 as shown in the third embodiment. In any case, the described and shown embodiments should all be regarded as pure representative examples in order to provide the best possible protection to the handled cables while partly providing the necessary restriction of movement of the cables in the cable hold device, in the apparatus and/or during the method as defined in the claims.

What is claimed is:

1. Cable hold device, comprising top and base portions hingedly connected with each other and defining a space between said top and base portions for accommodating at least one cable and for accommodating a portion of a sleeve surrounding the cable, said space being configured such that movement of said at least one cable in said space in directions transverse to said cable is restricted while said top and base portions are closed with respect to each other, said device further having means for preventing passage of the sleeve through the space and for preventing restoration of the sleeve after the sleeve has been moved longitudinally relative to the cable.

2. Cable hold device according to claim 1, wherein said space is configured for accommodating at least two cables and wherein the space further comprises partitioning means for partitioning said space so as to define subspaces, each of the subspaces being configured for accommodating one of the cables respectively.

3. Cable hold device according to claim 2, further comprising a handle and locking means for closing said top and base portions with respect to each other and for holding the top and base portions locked in the closed positions.

4. Cable hold device comprising top and base portions hingedly connected with each other and defining a space between said top and base portions for accommodating at least two cables, said space being configured such that movement of said cables in said space in directions transverse to said cable is restricted while said top and base portions are closed with respect to each other, said space comprising partitioning means for partitioning said space into subspaces, said subspaces being respectively configured such that each said subspace accommodates one said cable, said partitioning means, said top portion and said base portion being hingedly connected at a common hinge, said hinge extending substantially parallel to the cables.

5. Cable hold device according to claim 4, wherein said partitioning means is formed of a partitioning plate which extends substantially between said top and base portions when the top and base portions are closed with respect to each other.

6. Cable hold device according to claim 5, wherein said partitioning means is a sleeve retaining means for preventing the passage of a sleeve surrounding at least partly said cables through said space and preventing restoration of a deformed sleeve.

7. Cable hold device according to claim 6, further comprising at least one biasing means for biasing at least one of said top and base portions and said partitioning means.

8. Cable hold device according to claim 6, having marks for identifying the cable and the location thereof.

9. Cable hold device according to claim 4, wherein said top and base portions and said hinged partitioning plate are formed with recesses to guide said held cable.

10. Cable hold device comprising top and base portions hingedly connected with each other and defining a space therebetween, said space being configured for accommodating at least one cable, and a portion of a sleeve surrounding the cable, said space being configured for restricting movement of said cable in directions transverse to the cable when the top and base portions are closed with respect to each other, said device further comprising at least one cam means for restricting the movement of said cable in all directions except for one direction parallel to the cable.

11. Cable hold device according to claim 10, wherein said at least one cam means is provided at the top and base portions, respectively.

12. Cable hold device according to claim 10, wherein said top and base portions said partitioning means and said cam means are provided with surfaces having a large frictional resistance.

13. Cable hold device, comprising top and base portions hingedly connected with each other and defining a space between said top and base portions for accommodating at least two cables, said space being configured such that movement of said cables in said space is restricted while said top and base portions are closed with respect to each other, said device further comprising partitioning means for partitioning said space to define subspaces for the respective cables, said device further comprising a handle and locking means for closing said top and base portions with respect to each other and for holding said top and base portions locked in the closed position, at least one cam means being provided for restricting movement of said cables in all directions except for one direction, said device further comprising cam biasing means for adjustably spring biasing said cam means.

14. Cable hold device comprising top and base portions hingedly connected with each other and defining a space between said top and base portions for accommodating at least two cables, said space being configured such that movement of said cables in said space is restricted while said top and base portions are closed with respect to each other, partitioning means for partitioning said space so as to define subspaces for the respective cables, a handle and locking means for closing said top and base portions with respect to each other and for holding said top and base portions locked in the closed position, at least one cam means for restricting movement of said cables in all directions except for one direction, said top and base portions, said partitioning means and said cam means being provided with surfaces having grooves with a cross section for at least partly mating with the respective cables.

* * * * *